United States Patent
Carr (10) Patent No.: US 10,771,926 B1
(45) Date of Patent: Sep. 8, 2020

(54) PACKAGE TRACKING SYSTEM

(71) Applicant: Peggy J. Carr, Myrtle Beach, SC (US)

(72) Inventor: Peggy J. Carr, Myrtle Beach, SC (US)

(*) Notice: Subject to any disclaimer, the term of this patent is extended or adjusted under 35 U.S.C. 154(b) by 0 days.

(21) Appl. No.: 16/700,276

(22) Filed: Dec. 2, 2019

Related U.S. Application Data (60) Provisional application No. 62/773,627, filed on Nov. 30, 2018.

(51) Int. Cl.
| | |
|---|---|
| *H04W 24/00* | (2009.01) |
| *H04W 4/029* | (2018.01) |
| *G06Q 10/08* | (2012.01) |
| *H04N 5/225* | (2006.01) |
| *G01S 19/13* | (2010.01) |
| *H04W 84/04* | (2009.01) |
| *H04M 1/725* | (2006.01) |

(52) U.S. Cl.
CPC ........ *H04W 4/029* (2018.02); *G06Q 10/0833* (2013.01); *H04N 5/2253* (2013.01); *H04N 5/2254* (2013.01); *G01S 19/13* (2013.01); *H04M 1/72519* (2013.01); *H04M 1/72522* (2013.01); *H04W 84/042* (2013.01)

(58) Field of Classification Search
CPC .............. H04W 4/029; H04W 84/042; G06Q 10/0833; H04N 5/2253; H04N 5/2254; G01S 19/13; H04M 1/72519; H04M 1/72522
USPC ...................... 455/456.1, 456.6, 550.1, 556.1
See application file for complete search history.

(56) References Cited

U.S. PATENT DOCUMENTS

| | | | |
|---|---|---|---|
| 5,775,735 A * | 7/1998 | Bolnick ................... G09F 3/10 | |
| | | | 283/81 |
| 6,469,815 B1 | 10/2002 | Poon et al. | |
| 6,522,440 B1 | 2/2003 | Poon et al. | |
| 7,002,472 B2 | 2/2006 | Stratmoen et al. | |
| 7,248,160 B2 | 7/2007 | Mangan et al. | |
| 7,746,228 B2 | 6/2010 | Sensenig et al. | |
| 8,154,421 B2 | 4/2012 | Saltzman et al. | |
| 9,111,189 B2 | 8/2015 | Scalisi et al. | |
| 10,181,111 B1 * | 1/2019 | Kohli .............. G06Q 10/08355 | |
| 2005/0251330 A1 | 11/2005 | Waterhouse et al. | |
| 2006/0241985 A1 | 10/2006 | Arnold et al. | |
| 2007/0028642 A1 | 2/2007 | Glade et al. | |
| 2009/0266722 A1 | 10/2009 | Rogers et al. | |
| 2013/0344885 A1 * | 12/2013 | Parisi .................... H04W 4/029 | |
| | | | 455/456.1 |
| 2016/0105204 A1 * | 4/2016 | Ko ....................... H04B 1/3877 | |
| | | | 455/575.8 |
| 2016/0165135 A1 * | 6/2016 | Lee .................... H04N 5/23238 | |
| | | | 348/38 |
| 2017/0344939 A1 * | 11/2017 | Linton .................. G01S 5/0294 | |
| 2018/0365635 A1 * | 12/2018 | Lucrecio ............ G06Q 10/0833 | |
| 2018/0365636 A1 * | 12/2018 | Lucrecio .............. H04B 17/318 | |
| 2018/0365771 A1 * | 12/2018 | Kilburn ................... G07C 5/02 | |

(Continued)

*Primary Examiner* — Danh C Le
(74) *Attorney, Agent, or Firm* — Cramer Patent & Design, PLLC; Aaron R. Cramer (57) ABSTRACT

A package tracking system method utilizes a GPS-enabled tracking device which is securable within a given package to be shipped. The tracking device is configured to permit the device to be followed online by an authorized user. The tracking device further permits deep penetration of the tracking signal through a given unit of packaging material and also incorporates a tampering indicator.

19 Claims, 6 Drawing Sheets

(56) References Cited

U.S. PATENT DOCUMENTS

2018/0367872 A1* 12/2018 Lucrecio .................. H04Q 9/00
2019/0113632 A1*  4/2019 Lucrecio .............. G01C 21/165

* cited by examiner

PACKAGE TRACKING SYSTEM

RELATED APPLICATIONS

The present invention is a continuation-in-part and was first described in and claims the benefit of U.S. Provisional Application No. 62/773,627 filed Nov. 30, 2018, the entire disclosures of which are incorporated herein by reference.

FIELD OF THE INVENTION

The present invention relates generally to the field of package tracking and specifically to a package tracking system.

BACKGROUND OF THE INVENTION

The present invention is a theft-protection and package-tracking device and service that allows e-commerce consumers the opportunity to take control of their package's security, without having to let delivery drivers into their homes, be sure they are home for the package delivery or be inconvenienced by having it delivered to an alternate address to avoid having the package stolen. The theft-protection and package-tracking device is equipped with a built-in Global Positioning System (GPS) and image-capturing technology that gets placed in the package of an item(s) being shipped from an e-commerce shipping facility.

According to the U.S. Department of Commerce, e-commerce sales represent up to nine percent (9%) of retail sales. A 2017 USA Today article reported that package theft affects nearly one third of Americans. U.S. Homeowners ship an average of twenty-seven (27) packages to their homes each year and according to August Home Inc. Eleven million (11,000,000) packages were stolen in 2016. Forty-two percent (42%) of thefts happened to city dwellers, twenty-six percent (26%) of the stolen packages happened in the suburbs and nineteen percent (19%) in rural areas. With the average value of packages costing two hundred dollars ($200 USD) or more to replace, eighty percent (80%) of homeowners in the August Home study mentioned they would invest in smart home technology to increase package security and twenty-eight (28%) of those surveyed mentioned that it would be ideal if delivery services could leave packages directly inside their home. The present invention was created to address this problem and put the tracking and security of a consumer's shipped package in the hands of the consumer.

SUMMARY OF THE INVENTION

The principles of the present invention provide a tracking unit, comprising a casing first half having an outer surface and a lower edge and a casing second half having an outer surface and a lower edge. The casing second half is removably and securely attached to the casing first half with a plurality of fasteners. The casing first half and the casing second half define an interior where a plurality of electronic parts reside. The tracking unit also comprises a camera lens which is disposed on the outer surface of the casing first half, a first indicia location, a second indicia location, and a third indicia location disposed on the outer surface of the casing second half, a battery indicator light and a light sensor which is provided at the lower edge of the casing first half, an activation switch which is attached to an inner portion of the casing second half and a pair of notched halves forming a charging port located on a pair of corresponding ends of each of the casing halves when the casing halves are conjoined. The charging port enables passage of a pull tab to pass therethrough. The tracking unit also comprises a battery which is affixed within the casing second half and a cellular module, a GPS receiver, a camera and a SIM card. The charging port and the activation switch are all affixed to the casing second half and are all in electrical communication with the battery.

The interior may include one or more resilient stand-offs, one or more baffles, or one or more risers to prevent or eliminate caving in. The first indicia location may include postage paid address information for a shipping location 81 while the second indicia location may include the identifier code for the tracking unit. The third indicia location may include a unique identifier for the tracking unit. The indicia locations may be a raised part of the casing second half. The indicia locations may be a lowered part of the casing second half. The indicia locations may be a windowed part of the casing second half. The activation switch of the tracking unit may be in mechanical communication with the pull tab. The activation switch may provide activation of communication with the shipping location. The GPS receiver may have a tipping mechanism integrated therewith to determine the orientation of the tracking unit. The camera may be mounted so as to be aligned with the camera lens of the casing first half. The light sensor, upon sensing light (ostensibly when unauthorized opening of the individual package item has occurred), may communicate with the shipping location. Upon the communication of an unauthorized opening, the shipping location (or manager thereof) may selectively activate the camera.

The tracking unit may also comprise a cable which has a first terminal end and an opposing second end. The first terminal end of the cable may be mechanically affixed to the pull tab and the opposing second terminal end of the cable may be affixed within an individual tracker slot of a shipping container holder. The shipping container holder may include a plurality of tracker slots each sized to hold the tracking unit therein, the charging port and the activation switch is within each of the tracker slots and is connected to the pull tab. The pull tab may be properly seated with the activation switch through the charging port. When the pull tab is removed from the device, the activation switch is activated to communicate with the shipping location.

The tracking unit may communicate with the shipping location, indicating that the tracking unit has been paired with an individual package item. A plurality of the tracking units may be stored in between usage or during a charging event within the shipping container holder. The tracking unit may be a generally rectangular prism having a plurality of rounded corners. The tracking unit may be made of hard plastic. The tracking unit may be three-and-a-half inches in length by five inches in width by one-quarter inch in height.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 tracking unit
11 casing first half
12 casing second half
15a camera lens
15b camera
16 activation switch
17 first indicia
18 second indicia
19 third indicia
20 GPS receiver
20a cellular module
21 SIM card
22 battery
25 charging port
30 fastener
41 pull tab
42 cable
50 shipping container holder
51 tracker slot
60 battery indicator light
61 light sensor
70 charging control circuit
71 main processor
80 individual package item
81 shipping location
82 first cellular signal
83 first local cellular tower
84 travel path
85 carrier
86 intermediate cellular signal
87 intermediate local cellular tower
88 destination location
89 final cellular signal
90 final local cellular tower

1. DESCRIPTION OF THE INVENTION

The best mode for carrying out the invention is presented in terms of its preferred embodiment, herein depicted within FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

2. DETAILED DESCRIPTION OF THE FIGURES

The present invention comprises a system for tracking packages 80, wherein a tracking unit 10 is preferable provided within, affixed, or otherwise attached to an individual package item 80. Such an individual package item 80 in a preferred method is delivered from an outside source, such as a manufacturing facility (herein described as the "sender"), to a shipping location 81, such as a warehouse, facilitating the system. The shipping location 81 has a physical address, which is printed with postage paid identifier, preferably a barcode, on a first indicia 17 location on the tracking unit 10. Each tracking unit 10 has a corresponding identifier code, preferably printed as a barcode on the second indicia 18 location on the tracking unit 10. The shipping location 81 assigns a particular tracking unit 10 having a unique identifier, such as a barcode, to an individual package item 80, and logs or otherwise memorializes the assignment. The assignment can be randomly generated. The unique identifier is preferably printed on a location (such as the third indicia 19) on the tracking unit 10. The shipping location 81 then delivers or contracts a delivery to the destination location 88 of the individual package item 80. In a typical fashion, the destination location 88 orders the individual package item 80 from the sender or a vendor of the sender. The logging of the assignment can be saved in a database capable of being accessible and managed by the shipping location 81, wherein the unique identifier is capable of being accessed by either the shipping location 81, the receiver, or both. The corresponding identifier code of each tracking unit 10 is capable of being accessed by the shipping location 81 or a manager of the database. This also serves to function as a real-time inventory check of the shipping location 81.

Figure 1:
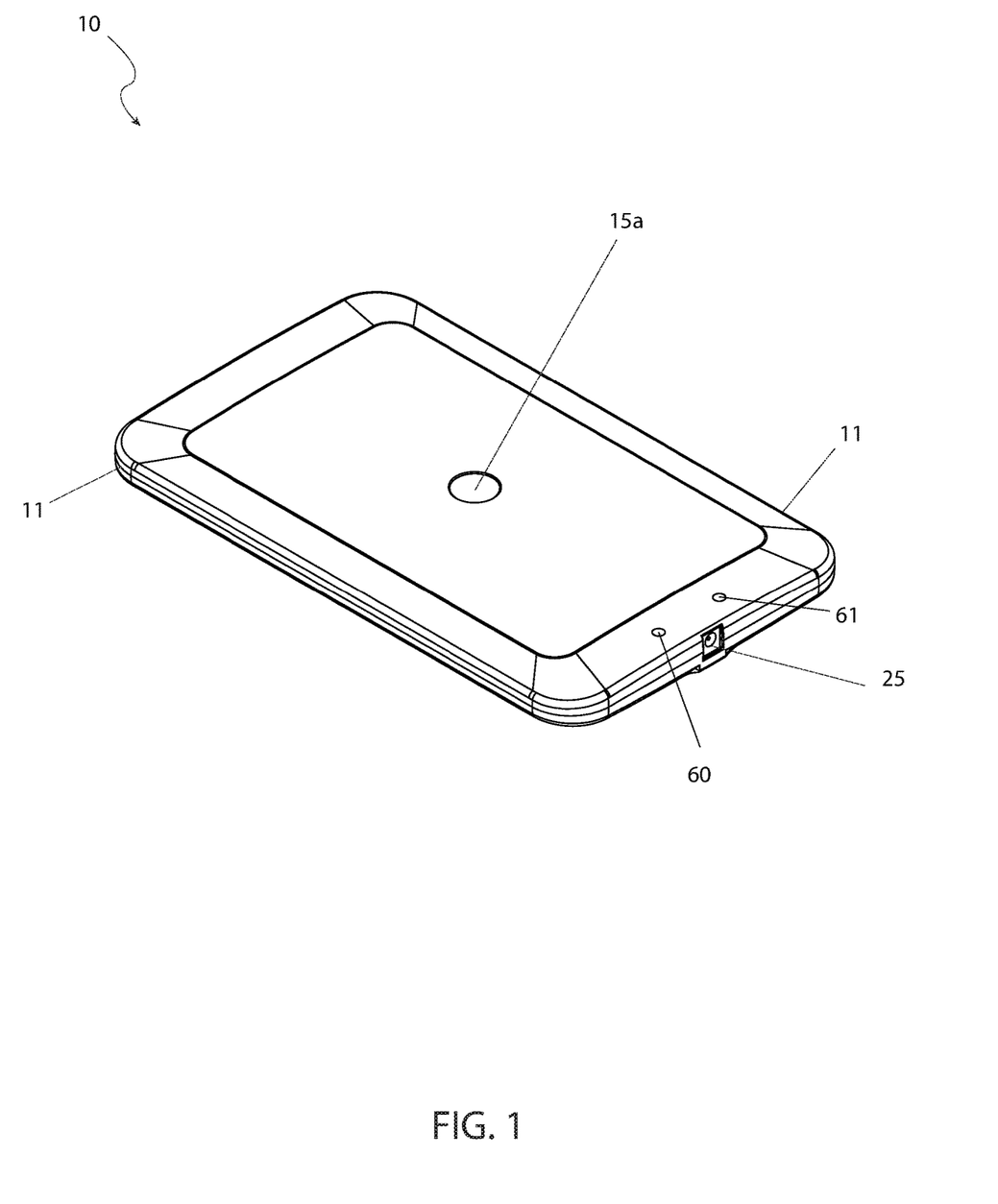
FIG. 1 is a front perspective view of a tracking unit 10 utilized in a package tracking system, according to a preferred embodiment of the present invention.
Figure 2:
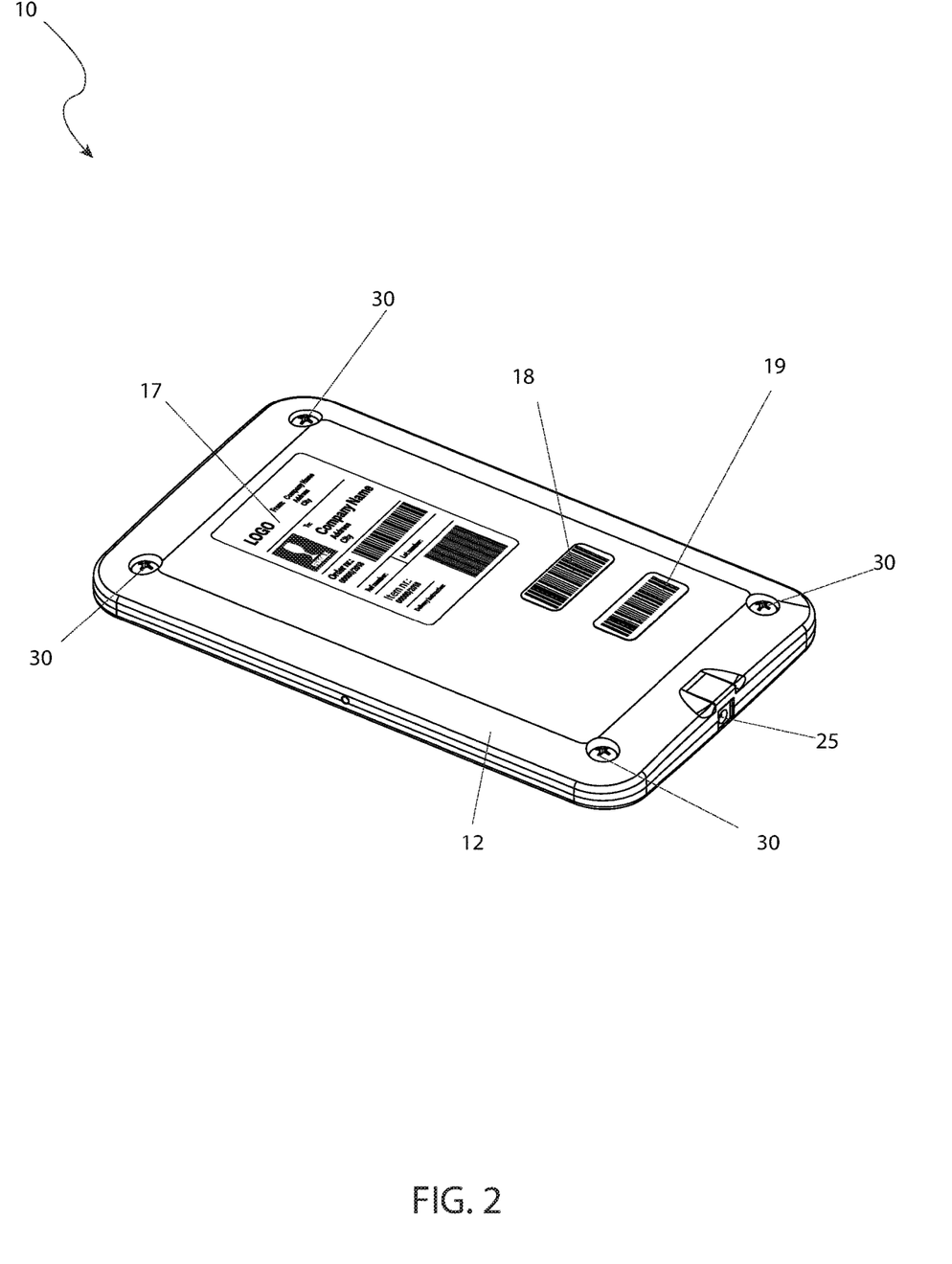
FIG. 2 is a rear perspective view of the tracking unit 10 utilized in a package tracking system, according to a preferred embodiment of the present invention.
Figure 3:
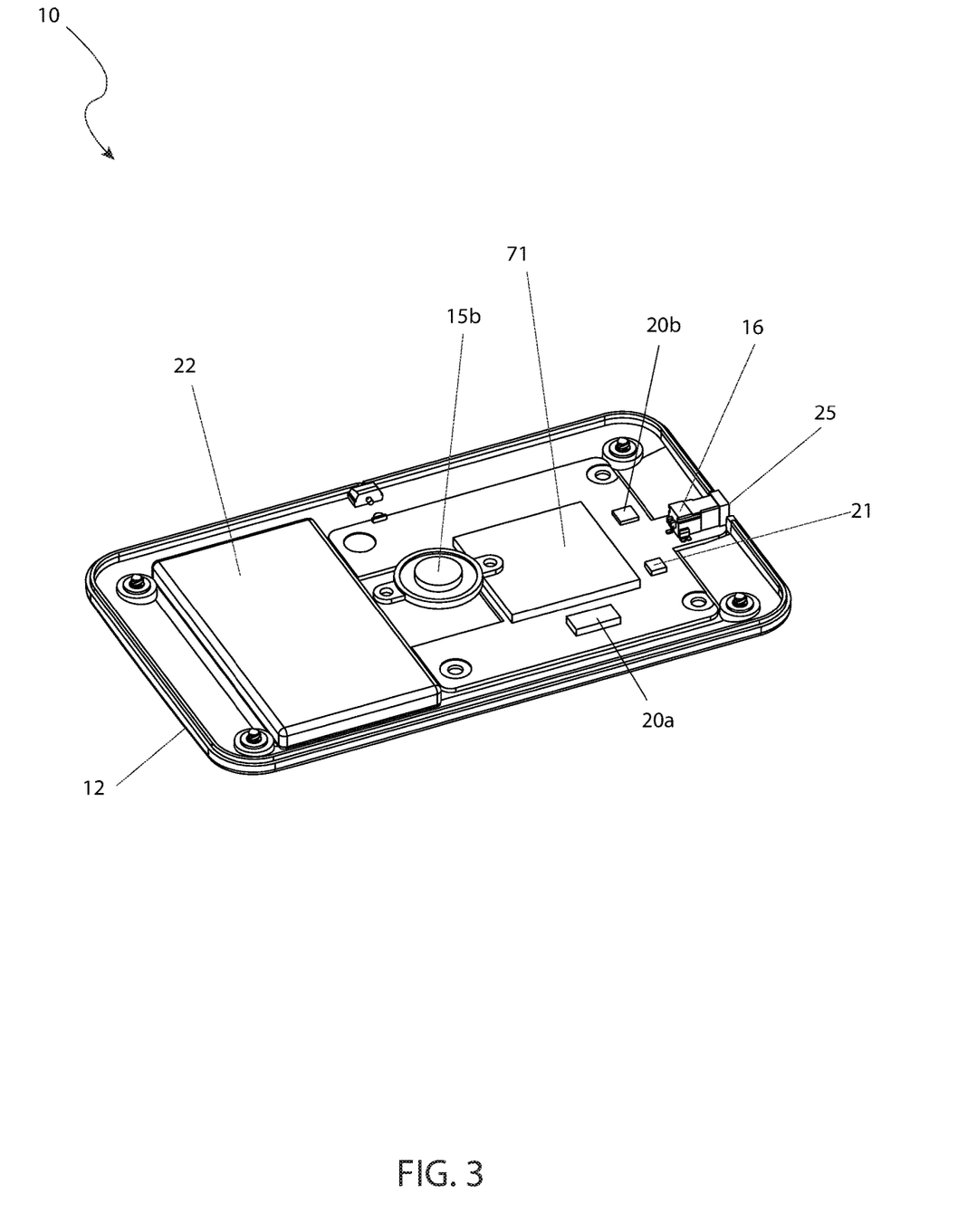
FIG. 3 is a perspective exploded view of the interior of the tracking unit 10, according to the preferred embodiment of the present invention.

Referring now more closely to FIGS. 1 through 3, which illustrate several views of the tracking unit 10. The tracking unit 10 preferably comprises a casing first half 11 removably and securely attached to a casing second half 12 with a plurality of fasteners 30. The casing first half 11 and casing second half 12 define an interior where electronic parts reside. The preferred dimensions of the tracking unit 10 is a hard plastic, generally rectangular prism having rounded corners with the approximate dimensions of three-and-a-half inches by five inches by one-quarter inch (3-1½×5×¼ inches). The interior may or may not have resilient stand-offs, baffles, or risers to prevent or eliminate caving in (which may occur in cases of impact or vacuum-induced environments).

On the outer surface of the casing first half 11 is a camera lens 15a. On the outer surface of the casing second half 12 is a first indicia location 17, a second indicia location 18, and a third indicia location 19. Any of the indicia locations 17, 18, 19, can be a raised, lowered, or a windowed part of the casing second half 12. As mentioned above, the first indicia location 17 can include postage paid address information for the shipping location 81, the second indicia location 18 can include the identifier code for the tracking unit 10, and the third indicia location 19 can include the unique identifier for the tracking unit 10. A battery indicator light 60 and a light sensor 61 is provided at the lower edge of the first half 11.

An activation switch 16 is attached to an inner portion of the casing second half 12 adjacent an edge thereof. Preferably, the activation switch 16 is attached to a center position of a short edge of the casing second half 12. Located on corresponding ends of each casing half 11, 12, is a pair of notched halves that form a charging port 25 when the halves 11, 12 are conjoined. This charging port 25 enables passage of a pull tab 41, to pass therethrough.

Within the casing second half 12 and affixed thereto is a battery 22. A cellular module 20a, a GPS receiver 20b, a camera 15b, a SIM card 21, the charging port 25, and the activation switch 16 are all affixed to the casing second half 12 and are all in electrical communication with the battery 22. The activation switch 16 provides a selective activation or deactivation of power from the battery 22 to the aforementioned electronic features. The GPS receiver 20b has a tipping mechanism integrated therewith to determine the orientation of the tracking unit 10, such as face-down (i.e. the casing second half 12 is facing outward) or face-up (i.e. the casing first half 11 is facing outward). The camera 15b is mounted so as to be aligned with the camera lens 15a of the casing first half 11.

Figure 4:
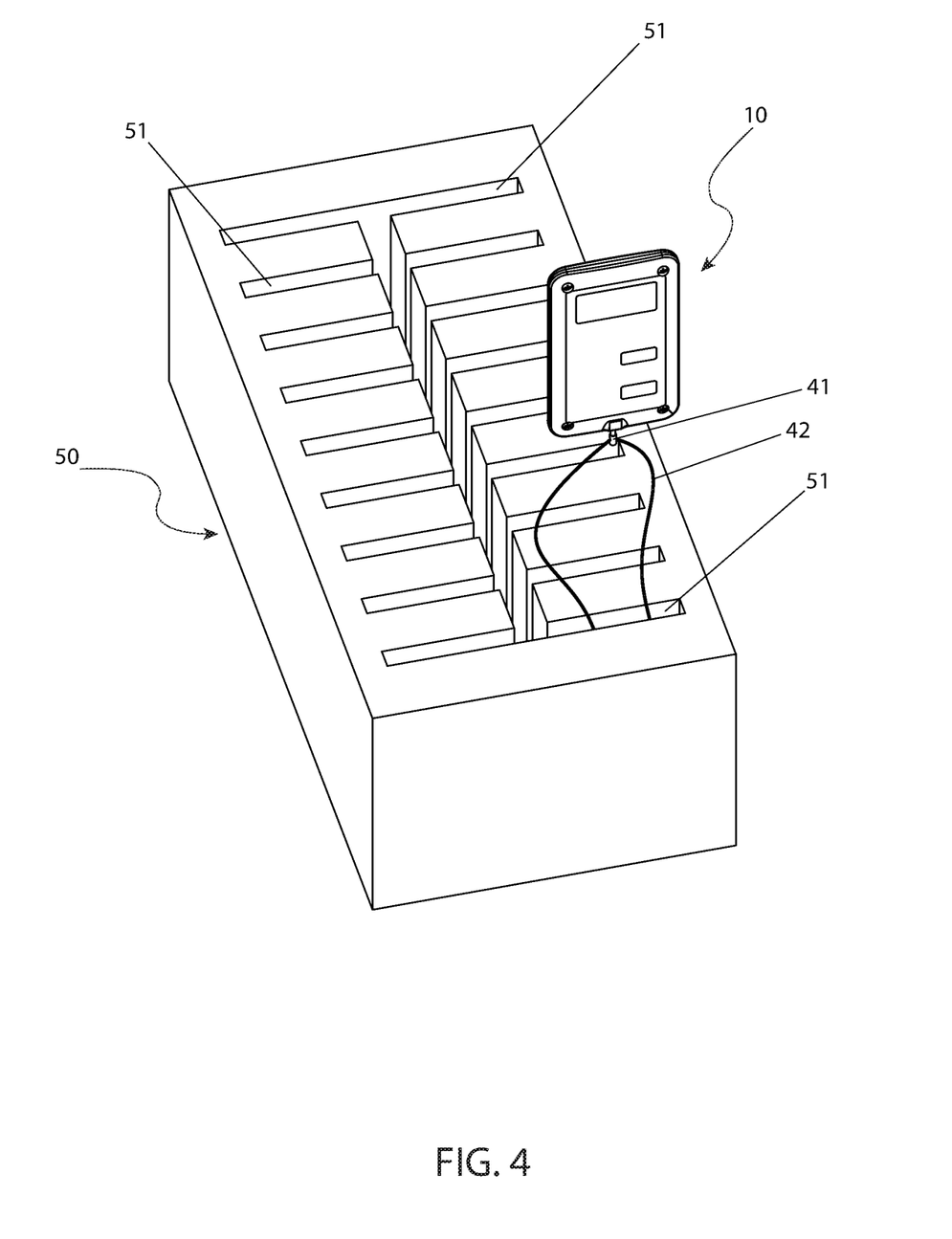
FIG. 4 is a perspective environmental view of the tracking unit 10 and holder 50 of the package tracking system, according to the preferred embodiment of the present invention.

FIG. 4 illustrates the system being used ostensibly at the shipping location 81. Multiple tracking units 10 are capable of being stored in between usage or during a charging event within a holder 50. The activation switch 16 of each tracking unit 10 is capable of being in mechanical communication with the pull tab 41. The first terminal end of each cable 42 is mechanically affixed to the pull tab 41. The opposing second terminal end of each cable 42 is affixed within an individual tracker slot 51 of the shipping container holder 50, such as being embedded there within. In a preferred embodiment, when the pull tab 41 is properly seated with the activation switch 16 through the charging port 25, the tracking unit 10 is asleep and communicates with the shipping location 81, indicating that the tracking unit 10 has been paired with the individual package item 80. When the pull tab 41 is removed from the activation switch 16, it is communicated to the shipping location 81 that the tracking unit 10 has been removed from the holder 50.

The shipping container holder 50 is generally rectangular, having a plurality of tracker slots 51 each sized to hold an individual tracking unit 10 therein, preferably on its edge such that the charging port 25 and activation switch 16 is within the tracker slot 51 and able to be connected to the pull tab 41. Each tracker slot 51 is in environmental communication with a center slot. The center slot is preferably located on a bisecting centerline of the shipping container holder 50, wherein the tracking slots 51 are located on either side of the center slot. The shipping container holder 50 is preferably a polyurethane foam or other similar material capable of maintaining shape and protecting each tracking unit 10 from an impact force.

Figure 5:
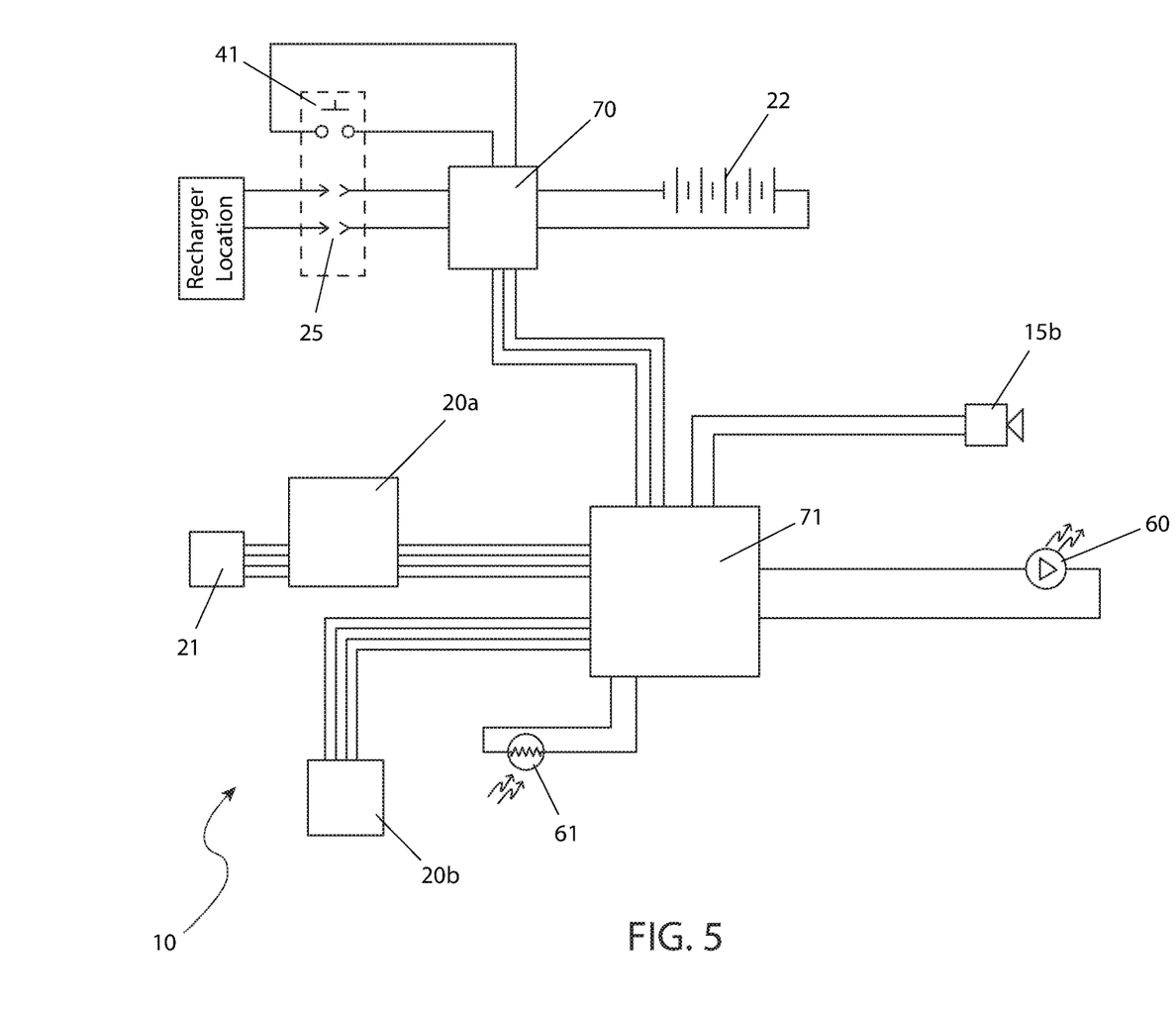
FIG. 5 is an electrical block diagram of the tracking unit 10, according to the preferred embodiment of the present invention; and, FIG. 6 is a graphical representation of the tracking unit 10, shown in a sequential state of utilization during a delivery cycle, according to the preferred embodiment of the present invention.

FIG. 5 represents an electrical block diagram of the tracking unit 10, according to the preferred embodiment of the present invention. Power and control signals are routed to a charging control circuit 70. The charging control circuit 70 regulates charging power to the battery 22 while being recharged, or routes power from the battery 22 to the balance of the circuitry shown when in an active state. Resultant power, when active, is routed to a main processor 71 which is provided with internal programmable code. The main processor 71 receives input signals from the camera 15b, the light sensor 61, the GPS receiver 20, and the cellular module 20a. The main processor 71 then provides output signals to the battery indicator light 60, and the cellular module 20a. Operating parameters on the appropriate cellular network are provided by the SIM card 21.

Figure 6:
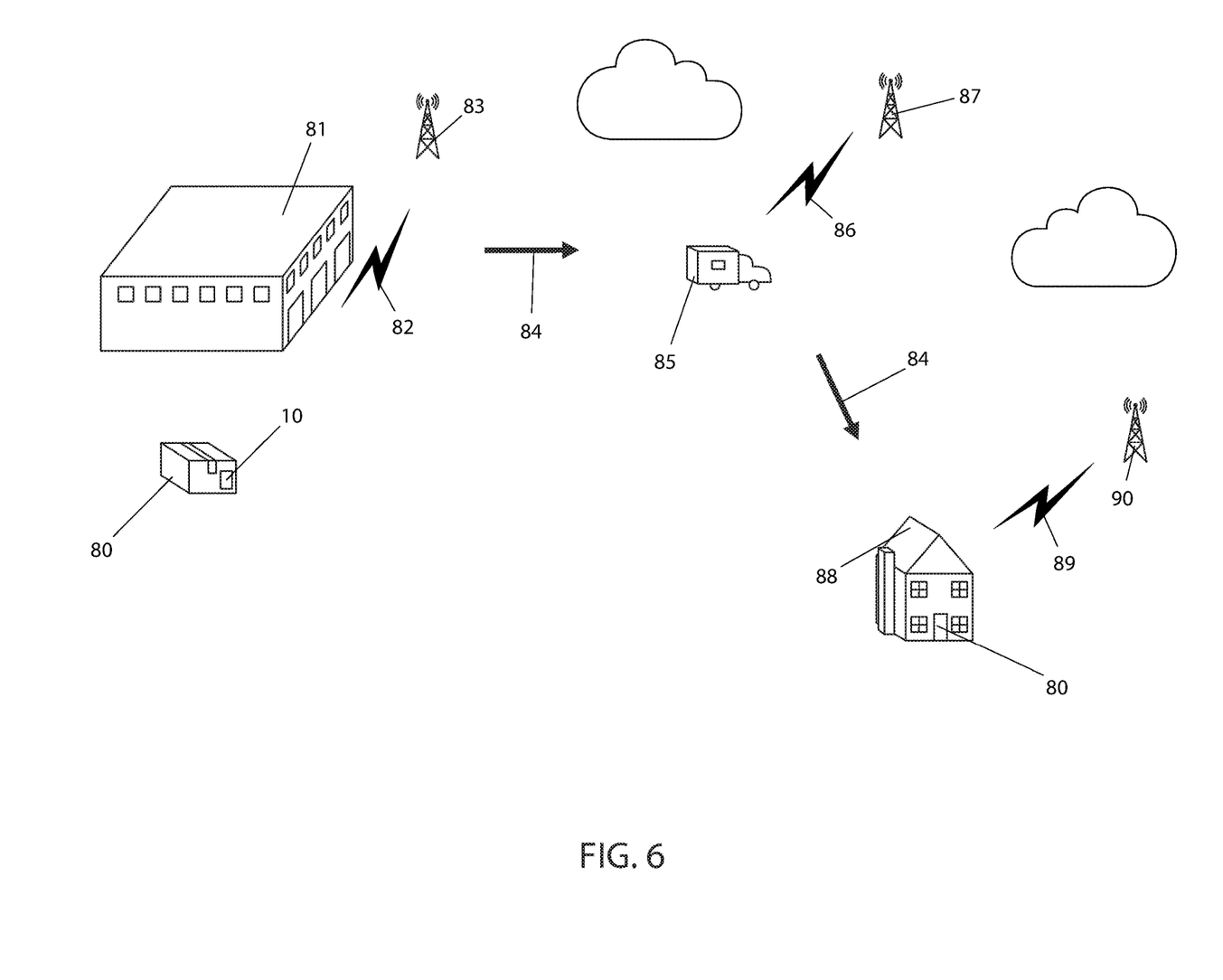

Referring to FIG. 6, a graphical representation of the tracking unit 10, shown in a sequential state of utilization during a delivery cycle, according to the preferred embodiment of the present invention is shown. The tracking unit 10, in an active state, removed from the shipping container holder 50, is affixed or inserted into a individual package item 80, at the shipping location 81. The tracking unit 10 is logged and coordinated with a destination as aforementioned described. A first cellular signal 82 to a first local cellular tower 83 provides verification of logging activity and live tracking commences. Shipping then commences using standard existing practices along a travel path 84 using a carrier 85, here shown as a delivery truck. Tracking along the travel path 84 is then made by at least one (1) intermediate cellular signal 86 to an intermediate local cellular tower 87. The length of the travel path 84 can be as short as fractions of a mile or up to thousands of miles with the number or intermediate cellular signals 86 to intermediate local cellular towers 87 varying in linear manner. Upon arrival at a destination location 88, here shown as a house, the individual package item 80 is dispositioned as delivered. A final cellular signal 89 to a final local cellular tower 90 is made to signal delivery. If at any point along the travel path 84, as the tracked package 80 is opened, the light sensor 61 detects the opening, and communicates with the shipping location 80. The shipping location 80 (or manager thereof) may selectively activate the camera 15b to provide a video signal via 89 along with exact time and GPS coordinates of the opening of the individual package item 80. Such action is envisioned to signal opening time, opening location, and opening environment (video) of the individual package item 80.

3. OPERATION OF THE PREFERRED EMBODIMENT

The preferred embodiment of the system can be utilized by the common operator in a simple and effortless manner with little or no training. It is envisioned that the tracking unit 10 would be constructed in general accordance with FIG. 1 through FIG. 6. Upon procurement of the desired individual package item 80, the destination location 88 can select whether or not to activate the system by opting to use the tracking unit 10 on the individual package item 80 and having the corresponding unique identifier able to be accessed remotely.

Upon a positive selection of activating the system, the destination location 88 enters the unique identifier to enable the system. The system is capable of tracking the location of the individual package item 80 upon which the tracking unit 10 is placed (via communication with the GPS receiver 20, the cellular module 20a), the age of the tracking unit 10, and the life of the battery 22 of the tracking unit 10, among other diagnostic tests, at any point between initial activation of the system at the shipping location 81 until receipt by the destination location 88. It is preferred that the accessibility of selected information is instantaneously or nearly so. It is also preferred that a pre-determined allotment of time per day such accessibility is available to preserve the life of the battery 22. A receipt of the individual package item 80 is achieved when the tracking unit 10 enters a pre-determined radius about an inputted address, such as a delivery address of the destination location 88. In a preferred embodiment, the predetermined radius can be one mile (1 mi.). Once entered within the pre-determined radius, the tracking unit 10 sends an alert to the sender (or any manager thereof), shipping location 81 (or any manager thereof), and/or destination location 88 (or any manager thereof) via a wireless signal or message. A secondary predetermined radius can also similarly alert any of the principals mentioned above. Such as secondary predetermined radius can be twenty feet (20 ft.).

At this time, any of the principals mentioned above can be invited to activate a video or camera recording device 15b pre-installed at the delivery location to verify actual delivery, either live or recorded for later viewing. If the tracking unit 10 and individual package item 80 travels outside of the secondary predetermined radius, any of the principals mentioned above is prompted to verify authorization of such removal. Upon a negative answer to the authorization, the tracking unit 10 transmits an alert signal to any of the principals mentioned above to provide subsequent action, such as informing local authorities. Additionally, the camera 15b in the tracking unit 10 is then selectively activated by the shipping location 81 (or any manager thereof) once the light sensor 61 is activated, which can then capture an image of an unauthorized user or location of the individual package item 80 with the tracking unit 10 outside of the secondary predetermined area. Upon receipt, the tracking unit 10 can remain activated for a pre-determined amount of time and the destination location 88 has a pre-determined amount of time to deliver the tracking unit 10 to the shipping location 81, as indicated on the return address listed in first indicia location 17.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A tracking unit, comprising:
    a casing first half having an outer surface and a lower edge;
    a casing second half having an outer surface and a lower edge, the casing second half is removably and securely attached to the casing first half with a plurality of fasteners, the casing first half and the casing second half define an interior where a plurality of electronic parts reside;
    a camera lens disposed on the outer surface of the casing first half;
    a first indicia location, a second indicia location, and a third indicia location disposed on the outer surface of the casing second half;
    a battery indicator light and a light sensor provided at the lower edge of the casing first half;
    an activation switch attached to an inner portion of the casing second half;
    a pair of notched halves forming a charging port located on a pair of corresponding ends of each of the casing halves when the casing halves are conjoined, the charging port enables passage of a pull tab to pass therethrough;
    a battery affixed within the casing second half;
    a cellular module, a GPS receiver, a camera, a SIM card, the charging port, and the activation switch are all affixed to the casing second half and are all in electrical communication with the battery; and,
    a cable having a first terminal end and an opposing second end, the first terminal end of the cable is mechanically affixed to the pull tab and the opposing second terminal end of the cable is affixed within an individual tracker slot of a shipping container holder, the shipping container holder includes a plurality of tracker slots each sized to hold the tracking unit therein, the charging port and the activation switch is capable of being connected to the pull tab.

2. The tracking unit according to claim 1, wherein the interior includes one or more resilient stand-offs, one or more baffles, or one or more risers to prevent or eliminate caving in.

3. The tracking unit according to claim 1, wherein the first indicia location includes postage paid address information for a shipping location.

4. The tracking unit according to claim 1, wherein the second indicia location includes the identifier code for the tracking unit.

5. The tracking unit according to claim 1, wherein the third indicia location includes a unique identifier for the tracking unit.

6. The tracking unit according to claim 1, wherein the indicia locations are a raised part of the casing second half.

7. The tracking unit according to claim 1, wherein the indicia locations are a lowered part of the casing second half.

8. The tracking unit according to claim 1, wherein the indicia locations are a windowed part of the casing second half.

9. The tracking unit according to claim 1, wherein the activation switch of the tracking unit is in mechanical communication with the pull tab.

10. The tracking unit according to claim 1, wherein the activation switch provides communication with a shipping location.

11. The tracking unit according to claim 1, wherein the GPS receiver has a tipping mechanism integrated therewith to determine the orientation of the tracking unit.

12. The tracking unit according to claim 1, wherein the camera is mounted so as to be aligned with the camera lens of the casing first half.

13. The tracking unit according to claim 1, wherein the tracking unit communicates with a shipping location, indicating that the tracking unit has been paired with an individual package item.

14. The tracking unit according to claim 13, wherein the light sensor communicates with a shipping location upon being activated due to presence of light.

15. The tracking unit according to claim 13, wherein the camera is selectively activated by a shipping location.

16. The tracking unit according to claim 14, wherein a plurality of the tracking units are stored within the shipping container holder.

17. The tracking unit according to claim 1, wherein the tracking unit is a generally rectangular prism having a plurality of rounded corners.

18. The tracking unit according to claim 1, wherein the tracking unit is made of hard plastic.

19. The tracking unit according to claim 1, wherein the tracking unit is three-and-a-half inches in length by five inches in width by one-quarter inch in height.

* * * * *